US006337912B2

(12) United States Patent
Buhr et al.

(10) Patent No.: US 6,337,912 B2
(45) Date of Patent: *Jan. 8, 2002

(54) METHOD OF AND SYSTEM FOR WRITING-IN KEY INFORMATION

(75) Inventors: Wolfgang Buhr; Helmut Hörner, both of Hamburg (DE)

(73) Assignee: U.S. Philips Corporation, New York, NY (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/914,444

(22) Filed: Aug. 19, 1997

(30) Foreign Application Priority Data

Aug. 22, 1996 (DE) ........................................ 196 33 802

(51) Int. Cl.7 ............................ H04L 9/12; H04L 9/00; H04K 1/00

(52) U.S. Cl. ........................ 380/279; 380/260; 713/185

(58) Field of Search ......................... 380/21, 185, 259, 380/260, 277, 278, 279; 235/380, 492; 213/65; 713/185, 65

(56) References Cited

U.S. PATENT DOCUMENTS 4,926,665 A * 5/1990 Stapley et al. ................ 70/277
5,218,638 A * 6/1993 Matsumoto et al. .......... 380/23
5,623,637 A * 4/1997 Jones et al. ................. 395/491
5,745,571 A * 4/1998 Zuk ............................ 380/21
5,838,251 A * 11/1998 Brinkmeyer et al. ... 340/825.31
5,959,276 A * 9/1999 Iijima ......................... 235/380

* cited by examiner

*Primary Examiner*—Gail Hayes
*Assistant Examiner*—Anthony DiLorenzo
(74) *Attorney, Agent, or Firm*—Theo Mak

(57) ABSTRACT

In order to unambiguously allocate a data carrier to an object, key information is written into the data carrier. Before writing-in the key information, secret identification information and open identification information is written into the data carrier. Copies of the secret and open information are stored in a central station. In the central station, for a particular data carrier, the open and secret information is associated with each other. In addition thereto, in the central station, object information for the particular object, and key information for the object are associated with each other. From the data carrier, the open identification information is sent to the central station to access the associated stored open and secret identification information so as to retrieve the stored secret identification information. In addition thereto, object information is sent to the central station to access the associated stored object and key information so as to retrieve the stored key information. The retrieved key information is encrypted with the retrieved secret identification information and the encrypted key information is sent to the data carrier. In the data carrier, the received encrypted key information is decrypted. The decrypted key information is written into the data carrier.

8 Claims, 1 Drawing Sheet

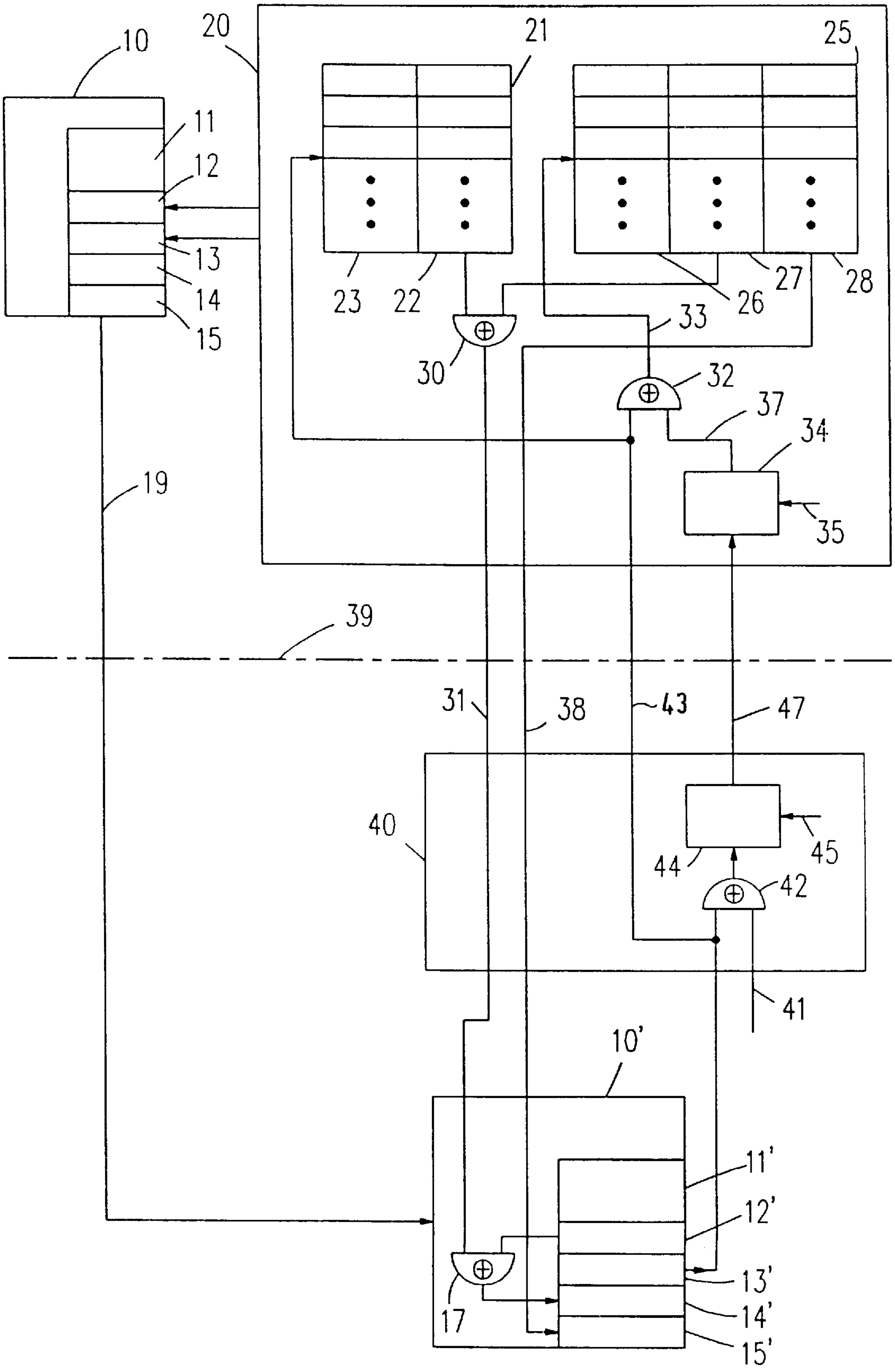
10
20
21
25
11
12
13
14
15
23
22
26
27
28
33
30
32
37
34
35
19
39
31
38
43
47
40
44
45
42
41
10'
11'
12'
13'
14'
15'
17

METHOD OF AND SYSTEM FOR WRITING-IN KEY INFORMATION

BACKGROUND OF THE INVENTION

The invention relates to a method of and a system for writing key information transmitted securely from a central station to a remote station into a data carrier available at said remote station. In a preferred use the data carrier is a key for a motor vehicle, which key is to be issued to the legitimate owner of the motor vehicle by a dealer, for example because the owner requires an additional key or has lost a key originally received upon the purchase of the motor vehicle. However, it is to be noted that the method and the system in accordance with the invention are also suited for other uses, for example for keys giving access to certain rooms or areas. In general, the method and the system in accordance with the invention enable selected allocated information to be written into a data carrier in a secure manner.

When key information stored at a central station is to be written into a data carrier at a remote station it is necessary in conventional systems to ensure that the transmission of the key information to the remote station cannot be overheard, because otherwise an unauthorized person can write the illegally intercepted key information into a data carrier of his own and can thus, for example, gain unauthorized access to protected rooms or areas. The alternative, i.e. to write the key information into the data carrier at the central station and subsequently send it to the remote station, is also unfavorable because the data carrier can be stolen during transportation.

SUMMARY OF THE INVENTION

It is an object of the invention to provide a method of securely writing key information into a data carrier which is issued at another station than that where the key information is generated or has been stored.

According to the invention this object is achieved in that the key contains stored identification information which cannot be read externally and is consequently secret, and in that the key information is encrypted with this identification information at the central station and the encrypted information is transferred to the data carrier at the issuing station. In the data carrier this encrypted key information is subsequently decrypted and stored.

This method has the advantage that the data carriers can be despatched freely because they do not contain any key information, so that a thief cannot abuse the data carrier. The unauthorized interception of the transmitted encrypted key information is neither of any avail to an unauthorized person if he does not have a data carrier with the correct identification information into which he can write the encrypted key information.

In this respect is important that each data carrier contains open further identification information, which is readable. Thus, it is possible to store in each data carrier individual identification information which differs from that in the other data carriers, the relationship between the open further identification information and the secret identification information being stored at the central station. Owing to this measure encrypted key information can be decrypted correctly by means of only one, i.e. the correct, data carrier.

In order to enable the allocation of secret identification information, key information and the open further identification information to be organized more easily, it is effective if the identification information and the open identification information are written into the data carrier at a further station before the data carrier is conveyed to the remote station. This further station should then be coupled to the central station via a protected information transmission link, so as to enable the same information to be written in at this station. The further station can also be identical to the central station.

The key information to be transmitted to the data carrier is assigned unambiguously to at least one individual object, for example a motor vehicle. When a data carrier is to be assigned to such an individual object the object information characterizing this object should be transmitted to the central station. In order to also protect this transmission path it is effective to encrypt the object information with the open further identification information prior to the transmission to the central station.

For data encryption a variety of methods are known. A particularly simple encryption and decryption of the key information and the objection information, which can be used in the method in accordance with the invention, is by exoring with the identification information. Since the identification information is secret, decryption is not possible without the key information being known even if the encryption method is known.

In addition to or instead of the encryption by means of an Exclusive-Or operation an asymmetrical encryption process can be used for encrypting the object information prior to transmission from the remote station to the central station, the open key being used for the encryption of the object information or the encrypted object information, decryption at the central station being effected by means of the secret key of the asymmetrical encryption process.

The invention further relates to a system for writing key information transmitted securely from a central station to a remote station into a data carrier available at said remote station, and to a data carrier and a terminal for use in such a system.

BRIEF DESCRIPTION OF THE DRAWING

The Sole FIGURE shows a system for writing key information, that is securely received from a central station, into a data carrier at a remote station.

The Sole FIGURE shows a system for writing key information, that is securely received from a central station 20, into a data carrier 10' at a remote station 40. The central station 20 has two memories 21 and 25. The memory 21 comprises two groups 22 and 23 of storage locations, which are associated with one another in pairs. By addressing a storage location of the group 23 with given information, i.e. open identification information of a given data carrier in the case of data carriers with individually distinct identification information or the specification of a data carrier group in the case of data carriers with identical identification information per group, this associated identification information is read from the associated storage location of the group 22.

Similarly, the memory 25 in the present example comprises three groups 26, 27 and 28 of storage locations. The storage locations of the group 26 store object information and each of these storage locations is associated with a given storage location of the group 27, which given storage location stores key information associated with this object. Furthermore, each storage location of the group 26 is preferably associated with a plurality of storage locations of the group 28, which storage locations store a plurality of identification numbers. Their meaning will be explained in some detail hereinafter.

A data carrier 10 is situated at a further station. It is obvious that in practice many data carriers are available, which are of mutually identical construction and of which the data carrier 10 shown here is representative. This data carrier 10 includes a processing unit 11 and four storage locations 12 to 15. The storage location 12 serves for storing identification information which can only be processed internally in the data carrier 10 and which is never made available externally. The storage location 13 stores open further information which characterizes the individual data carrier and which can be read out externally. Preferably, these two types of information are supplied by the central station 20, where they are written into two mutually associated storage locations 22 and 23 of the memory 21 and the respective information is written into the storage locations 12 and 13 at the further station, where the data carrier 10 is situated initially. The further station can be identical to the central station 20.

This writing into the storage locations 12 and 13 is effected for a multiplicity of data carriers and these data carriers are subsequently conveyed to a remote station via a transport path. This transport path has at least an unprotected part, shown as a dash-dot line 39. In this part of the transport path the data carriers could be stolen. However, such a theft cannot give rise to any substantial damage because the data carriers do not yet contain any key information and therefore cannot be used at an object.

If key information for a given object is to be written into a data carrier at the remote location, i.e. into the data carrier 10', which is shown in more detail in the FIGURE, this data carrier 10' is coupled to a terminal 40. As a result, the open identification information is read from the storage location 13' and is applied to the terminal 40 via the connection 43. Moreover, object information is entered via an input 41, for example by means of a keyboard. These two types of information are applied to an encryption device, which in the present case comprises two sections 42 and 44.

In the present case the section 42 of the encryption device takes the form of an Exclusive-Or element. The encrypted information, i.e. the object information encrypted with the open identification information, is applied to a section 44, which performs an asymmetrical encryption, for example in accordance with the RSA method, with a fixed key, which is shown here as being applied via an input 45. The key need not be secret because decryption is not possible with the aid of this key.

The additional encryption with the open identification information results in a substantially improved protection. It is now assumed that the data transmitted by a workshop, i.e. encrypted object information and open identification information, is intercepted by an unauthorized person who possesses preprogrammed keys. If this unauthorized person transmits the same encrypted object information, with the open identification information of his key but without the encryption with the open identification information, he would obtain the key information for the object information which has been encrypted with the secret identification information of his key and which is therefore correctly decrypted in the key, so that a valid key for the object is obtained illegally. Owing to the additional encryption with the open identification information the encrypted object information transmitted by the unauthorized person will not be decrypted correctly at the central station, so that the desired key information is not read correctly from the memory 25. However, if the unauthorized person transmits the likewise intercepted open identification information, he will merely obtain key information which has not been encrypted with the secret identification information stored in his key and which therefore cannot be decrypted. Thus, by tapping an authorized transmission it is not possible to obtain data for an object by means of which a key for the same object can be generated without authorization.

Similarly to the open identification information the encrypted information supplied by the section 44 via the line 47 is now transferred to the central station 20 via the line 43. This transfer can be effected via an non-protected path because the encrypted information on the line 47 cannot be decrypted without the secret key of the asymmetrical encryption being known and the open identification information does not include any direct reference to the key information required in the data carrier.

In the central station 20 the encrypted information on the line 47 is applied to a decryption device comprising the sections 32 and 34. In the section 34 the information transferred via the line 47 is decrypted by means of a secret key, shown here as being applied via an input 35. The information appearing on the output 37 of the section 34 of the decryption device is then the same as that on the output of the Exclusive-Or element 42 in the terminal 40. However, this is not yet the object information applied via the input 41 of the terminal 40. Therefore, the line 37 leads to an Exclusive Or element 32, having a further input to which the open identification information is applied via the line 43. Now the decrypted object information, which is applied to the memory 25, is available on the output 33 of the Exclusive Or element 32. In the group 26 that storage location is selected in which this object information has been stored and the key information is read from the associated storage location of the group 27. Moreover, the open identification information on the line 43 controls the memory 21, in that the storage location of the group 22 in which this identification information has been stored, is addressed and the associated storage location of the group 22 in which the secret identification information has been stored, is read out.

The information read from the memory 25 is applied to an encryption circuit 30, which also takes the form of an Exclusive-Or element. The information appearing on the output 31 is transmitted to the remote station, which is effected via a transmission path which need not be protected because the decrypted key information can only be recovered from the information on the line 31 with the aid of the correct secret identification information, but this information is hidden in the data carrier and is not transmitted directly.

Moreover, in the present example an identification number is read from an associated storage location of the group 28 and is transmitted to the remote station via the line 38, for which also a non-protected path can be used.

In the remote station the information on the line 31 and on the line 38 is applied to the data carrier 10' via the terminal 40. The identification number on the line 38 is written directly into the storage location 15' in the data carrier 10', while the encrypted key information on the line 31 is applied to a decryption device 17, which receives the secret identification information from the storage location 12' on a further input. This decryption device is again an Exclusive Or element and generates the decrypted key information on its output, which key information is written into the storage location 14'. Thus, the data carrier 10' receives all the information necessary for its use in conjunction with a given object, for example a motor vehicle, without the possibility of an unauthorized interception of the essential key information during transmission.

The identification number in the storage location 15' is not strictly necessary for the described method and, in the case that the data carrier is a key for a motor vehicle, this identification number serves for initially checking in the motor vehicle whether the key is permissible before it is ascertained whether an authorized key is used. The reason for this is that if by means of a non-authorized key, i.e. one with incorrect key information, a number of starting attempts have been made, all the functions of the motor vehicle are permanently disabled and can be restored only by means of a specific secret procedure. Thus, the identification number ensures that by means of a wrong key, which for example belongs to another motor vehicle and consequently contains other key information, no false starting attempts, otherwise recognized as permissible, can be made.

Suitably, each key authorized for a motor vehicle carries a different identification number, for which reason a plurality of identification numbers corresponding to the respective object information are stored in the memory 25 and in the associated object.

It is obvious that the encryption in the terminal 40 by means of the sections 42 and 44 and the corresponding decryption in the central station can also be effected in another manner than shown. The essential feature is that the information on the line 47 is encrypted in such a manner that a decryption by the transmitted information alone is not possible.

In the claims:

1. A method of securely transforming a data carrier remotely into a key associated with a particular object identified by object information, comprising the steps of;

forming a data carrier having stored secret identification information of said data carrier that is not externally accessible and also having stored open further identification information of ssaid data carrier that is externally accessible;

at a central station, storing said secret identification information in association with said open further identification information;

at said central station, storing said object information and key information in association with said object information;

at a remote station, retrieving said stored further identification information from said data carrier and entering said object information;

at said remote station, encrypting said entered object information with said retrieved further identification information to produce first encrypted object information, and using an asymmetrical encryption/decryption process having a public encryption key and a corresponding secret decryption key stored at said central station, further encrypting said first encrypted object information to produce second encrypted object information;

transmitting to said central station and receiving at said central station said second encrypted object information and said retrieved further indentification information;

at said central station, decrypting said received second encrypted object information with said secret decryption key stored at said central station to recreate said first encrypted object ionformation and further decrypting said recreated first encrypted object information with said received further identification information to recreate said object information;

at said central station, retrieving said secret identification information associated with said received further identification information and retrieving said key information associated with said recreated object information;

at said central station, encrypting said retieved key information with said retrieved secret identification information;

transmitting to said remote station and receiving at said remote station said encrypted key information;

at said remote station, retrieving said stored secret identification information, decrypting said received encrypted key information with said retrieved secret identification information to recreate said key information; and storing said recreated key information in said data carrier to transform said data carrier into said key associated with said particular object.

2. A method as claimed in claim 1, wherein an identification number is also stored in the central station in association with said object information and said identification number is also transmitted to said remote station with said encrypted key information.

3. A method as claimed in claim 1, wherein the data carrier is transformed into a key for a motor vehicle.

4. A method as claimed in claim 1, wherein the data carrier is transformed into a key for accessing the particular object identified by the object information.

5. A system for securely transforming a data carrier remotely into a key associated with a particular object identified by object information, comprising;

a data carrier having a data carrier memory for storing secret identification information of said data carrier that is not externally accessible and for also storing open further identification information of said data carrier that is externally accessible;

a central station having a central station memory for storing said secret identification information in association with said open identification information and for storing said object information and key information in association with said object information;

a remote station for retrieving said further identification information from said data carrier memory and for entering said object information;

said remote station including a first encryption section for encrypting said entered object information with said retrieved further identification information to produce first encrypted object information, and a second encryption section using an asymmetrical encryption/decryption process having a public encryption key stored at said remote station and a corresponding secret descryption key stored at said central station for further encrypting said first encrypted object information to produce second encrypted object information;

said remote station transmitting and said central station receiving said second encrypted object information and said retrieved further identification information;

said central station further including a first decryption section for decrpyting said received second encrypted object information with said stored secret decryption key to recreate said first encrypted object information and a second decryption section for further decrypting said recreated first encrypted object information with said received further identification information to recreate said object information;

said central station retrieving said secret identification information associated with said further identification information and retrieving said key information associated with said recreated object information;

said central station further including an encryption section for encrypting said retrieved key information with said retrieved secret identification information, said central station transmitting and said remote station receiving said encypted key information;

said remote station retrieving said stored secret identification information and including a decryption section for decrypting said received encrypted key information with said retrieved secret identification information to recreate said key information; and said remote station storing said recreated key information in said data carrier to transform said data carrier into said key associated with said particular object.

6. A system as claimed in claim 5, wherein an identification number is also stored in the central station memory in association with said object information and said identification number is also transmitted to said remote station with said encrypted key information.

7. A system as claimed in claim 5, wherein the data carrier is transformed into a key for a motor vehicle.

8. A system as claimed in claim 5, wherein the data carrier is transformed into a key for accessing the particular object identified by the object information.

* * * * *